(12) United States Patent
Lindmark

(10) Patent No.: US 12,542,870 B2
(45) Date of Patent: Feb. 3, 2026

(54) INTERACTIVE MAP FOR PROVIDING IMAGES FOR BACKGROUND REPLACEMENT IN A VIRTUAL MEETING

(71) Applicant: Google LLC, Mountain View, CA (US)

(72) Inventor: Stefan Lindmark, Östhammar (SE)

(73) Assignee: Google LLC, Mountain View, CA (US)

( * ) Notice: Subject to any disclaimer, the term of this patent is extended or adjusted under 35 U.S.C. 154(b) by 210 days.

(21) Appl. No.: 18/236,598

(22) Filed: Aug. 22, 2023

(65) Prior Publication Data

US 2025/0071240 A1 Feb. 27, 2025

(51) Int. Cl.
*H04N 7/15* (2006.01)
*G06T 7/194* (2017.01)
*H04N 5/272* (2006.01)

(52) U.S. Cl.
CPC ............. *H04N 7/157* (2013.01); *G06T 7/194* (2017.01); *H04N 5/272* (2013.01); *H04N 7/152* (2013.01); *G06T 2207/20132* (2013.01); *G06T 2207/30204* (2013.01)

(58) Field of Classification Search
CPC ........ H04N 7/157; H04N 5/272; H04N 7/152; G06T 7/194; G06T 2207/20132; G06T 2207/30204
See application file for complete search history.

(56) References Cited

U.S. PATENT DOCUMENTS

| | | | | |
|---|---|---|---|---|
| 2012/0154633 | A1* | 6/2012 | Rodriguez | H04M 1/72454 707/769 |
| 2012/0162249 | A1* | 6/2012 | Tsuda | G09B 29/106 345/629 |
| 2012/0293607 | A1* | 11/2012 | Bhogal | G06T 3/4038 348/E5.051 |
| 2022/0070389 | A1* | 3/2022 | Tangeland | H04N 23/80 |
| 2023/0126108 | A1* | 4/2023 | Roper | H04N 7/147 348/14.08 |
| 2023/0308603 | A1* | 9/2023 | Nicholson | G06T 7/194 |
| 2023/0421719 | A1* | 12/2023 | Zhu | H04N 5/272 |
| 2024/0267483 | A1* | 8/2024 | Kondapi | H04L 65/60 |

* cited by examiner

*Primary Examiner* — Stella L. Woo
(74) *Attorney, Agent, or Firm* — Lowenstein Sandler LLP

(57) ABSTRACT

Systems and methods for leveraging an interactive map for providing images for background replacement in a virtual meeting are provided. A user interface (UI) displaying a map is provided for presentation on a first client device associated with a first participant of a virtual meeting. in response to user input pertaining to a location on the map, an image associated with the location on the map is identified. Using the image associated with the location on the map, a background layer of a video stream provided by the first client device associated with the first participant is modified. the video stream with the modified background layer is provided for presentation on one or more other client devices of one or more other participants of the virtual meeting.

20 Claims, 8 Drawing Sheets

INTERACTIVE MAP FOR PROVIDING IMAGES FOR BACKGROUND REPLACEMENT IN A VIRTUAL MEETING

TECHNICAL FIELD

Aspects and implementations of the present disclosure relate to an interactive map for providing images for background replacement in a virtual meeting.

BACKGROUND

Virtual meetings can take place between multiple participants via a virtual meeting platform. A virtual meeting platform includes tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the virtual meeting platform can provide a user interface to display the video streams of participating client devices. Some virtual meeting platforms include tools to allow participants of the platform to replace their background with a static image, an animated image, or a video.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes leveraging an interactive map for providing images for background replacement in a virtual meeting. The method includes providing, for presentation on a first client device associated with a first participant of a virtual meeting, a user interface (UI) displaying a map. The method further includes, in response to user input pertaining to a location on the map, identifying an image associated with the location on the map. The method further includes modifying, using the image associated with the location on the map, a background layer of a video stream provided by the first client device associated with the first participant. The method further includes providing the video stream with the modified background layer for presentation on one or more other client devices of one or more other participants of the virtual meeting.

In some embodiments, to modify, using the image associated with the location on the map, the background layer of the video stream provided by the first client device associated with the first participant, the method includes identifying the background layer and a foreground layer in the video stream. The background layer is associated with images of surroundings of the first participant as captured by a camera of the first client device, and the foreground layer is associated with images of the first participant as captured by the camera of the first client device. The method further includes compositing the foreground layer on top of the image associated with the location on the map.

In some embodiments, to identify the background layer and the foreground layer of the video stream, the method includes providing a frame of the video stream as input to a machine learning model. The machine learning model is trained to predict, based on a given frame, segmentation labels for the given frame that represent foreground and background regions of the given frame. The method further includes obtaining outputs from the machine learning model, wherein the outputs include one or more foreground regions and one or more background regions. The method further includes combining the one or more foreground regions to obtain the foreground layer, and combining the one or more background regions to obtain the background layer.

In some embodiments, the image associated with the location on the map is a cropped selection of a panoramic image. In some embodiments, the method incudes dynamically modifying the cropped selection of the panoramic image based on a change of position of the first client device capturing the video stream.

In some embodiments, to dynamically modify the cropped selection of the panoramic image based on a change of position of the first client device capturing the video stream, the method includes determining a degree of rotation of the first client device between a first frame of the video stream and a second frame of the video stream, and modifying the cropped selection of the panoramic image proportional to the degree of rotation of the first client device.

In some embodiments, to determine the degree of rotation of the first client device, the method includes measuring the degree of rotation using a sensor of the first client device. In some embodiments, to determine the degree of rotation of the first client device, the method includes identifying one or more markers within the first frame of the video stream, identifying the one or more markers within the second frame of the video stream, and determining the degree of rotation based on a positional difference of the one or more markers between the first frame and the second frame of the video stream.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
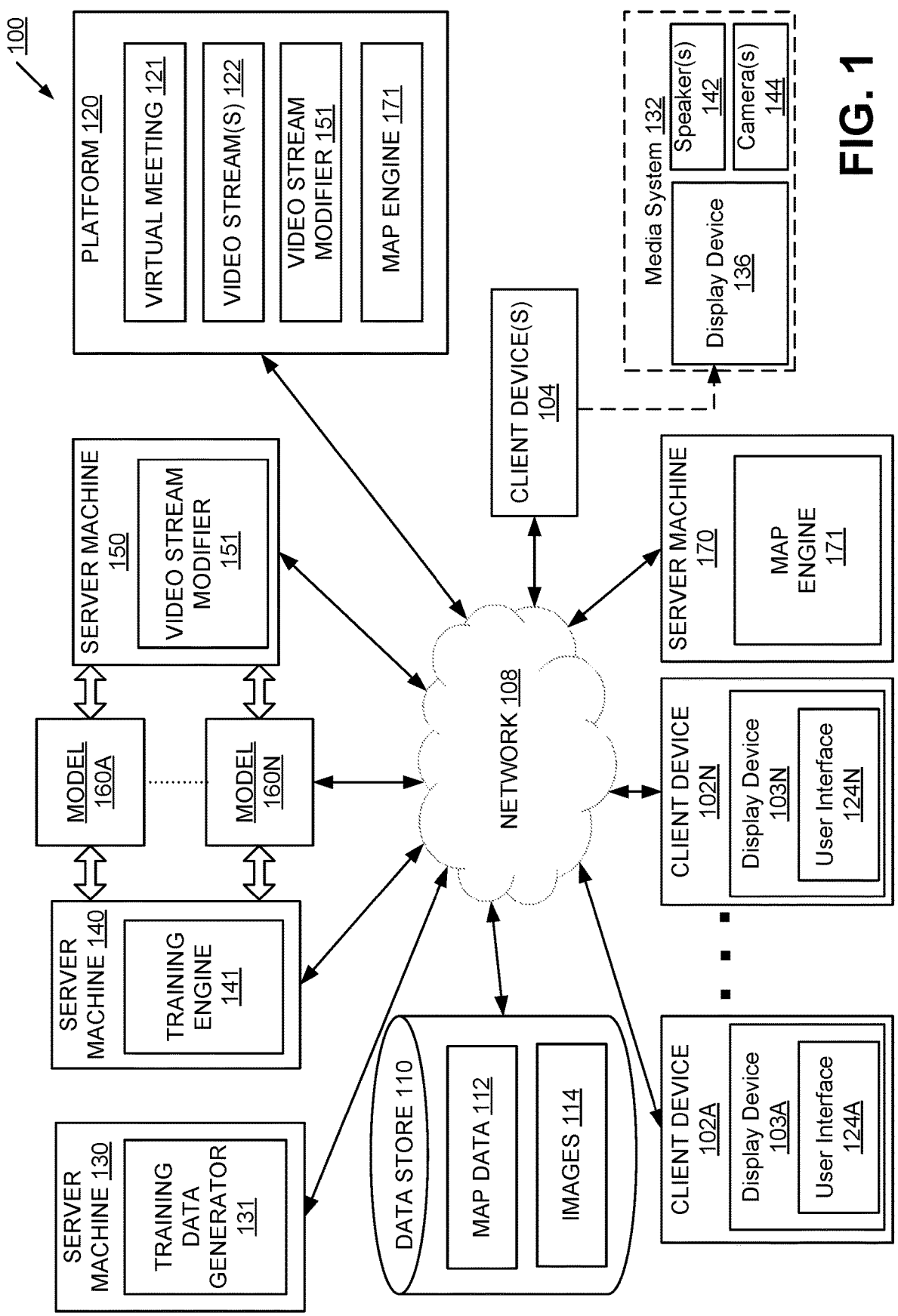
FIG. 1 illustrates an example system architecture capable of leveraging an interactive map for providing images for background replacement in a virtual meeting, in accordance with aspects and implementations of the present disclosure.

Aspects of the present disclosure relate to an interactive map for providing images for background replacement in a virtual meeting. A virtual meeting platform can enable video-based conferences between multiple participants via respective client devices that are connected over a network and share each other's audio (e.g., voice of a user recorded via a microphone of a client device) and/or video streams (e.g., a video captured by a camera of a client device) during a virtual meeting. In some instances, a virtual meeting platform can enable a significant number of client devices (e.g., up to one hundred or more client devices) to be connected via the virtual meeting. A virtual meeting (e.g., video conference) can refer to a virtual meeting during which a client device connected to the virtual meeting platform captures and transmits image data (e.g., video data collected by a camera of the client device) and/or audio data (e.g., collected by a microphone of the client device) to other client devices connected to the platform. The image data can, in some instances, depict a participant or a group of participants that are participating in the virtual meeting. The audio data can include, in some instances, an audio recording of audio provided by the participant or group of participants during the virtual meeting.

Virtual meetings can facilitate real-time communication and collaboration among geographically diverse participants. With an increasing number of virtual meetings, participants frequently utilize tools provided by virtual meeting platforms for background replacement. Background replacement can refer to a replacement or modification of image data, such as background image data/video data representing a background of a scene, of a video stream received from a client device of a participant with different background image data (e.g., video data or static image) representing a new and/or different background. The image data of the foreground, often representing the participant and received in the video stream from the client device of the participant, can be composited on the new background image data and the composited video stream having the new background can be transmitted to the client devices of the participants of the video conference for presentation.

Conventional virtual meeting platforms can offer, to virtual meeting participants, a limited set of predefined backgrounds for background replacement. Some virtual meeting platforms allow participants to upload personal images or internet-retrieved images, and use the personal or internet images for background replacement. Using personal or internet images for background replacement can be technically challenging for many participants, a problem that can be exacerbated when a participant is rushed to perform a background replacement before an imminent virtual meeting. Additionally, using internet images for background replacement can cause problems. For instance, internet images can be protected by an owner's copyright and/or trademark, include watermarks or undesirable features, can have aspect ratios that are unsuitable for use as a background image, inappropriate content, low resolution, or other features that negatively affect the presentation of the internet image as a background replacement.

Aspects of the disclosure address the above-mentioned challenges and other challenges by providing systems and techniques that identify relevant image/video for background placement based on location data associated with the client device of the participant or location data selected by the participant. In some embodiments, a virtual meeting user interface (UI) can present to a participant an interactive map (via a mapping service) that corresponds to the present location of the participant. In other embodiments, the virtual meeting UI can present an interactive map that corresponds to a selected location (e.g., France) of the participant, where the selected location is different than the present location (e.g., United States) of the participant. The interactive map can be retrieved from a mapping service using an application programming interface (API) call and identify various locations of interest. The participant can select one of the identified locations or any other location on the interactive map. The virtual meeting system can retrieve and display in the virtual meeting UI one or more images/videos that correspond to the selected location. In some instances, the retrieved images can be user uploaded images that have been uploaded to the mapping service, virtual meeting service or both. In some instances, the retrieved images can be street-level images from the mapping service, for example. Responsive to selecting a preferred image, virtual meeting system can retrieve the selected image (e.g., using an application programming interface (API) call to the mapping service) and perform a background replacement using the selected image. The participant's video stream that includes the new background can be provided to the client devices associated with the virtual meeting for presentation in the respective UIs.

In some embodiments, to modify the background (e.g., background layer) of the video stream, the video stream can be segmented into a background layer and foreground layer. Segmentation can refer to dividing an image into multiple regions or segments. For example, the video stream can be segmented into one or more background regions that, when combined, form the background layer; and into one or more foreground regions that, when combined, form the foreground layer. The background layer can represent the surroundings of the participant as captured by a camera of the participant's client device. The foreground layer can include a representation of the participant as captured by the camera of the client device. In some embodiments, the system can use a machine learning model (e.g., segmentation machine learning model) that is trained to predict, based on a given frame(s) or image(s), one or more background regions and one or more foreground regions. The system can use the machine learning model to identify a background layer and a foreground layer of the video stream based on the predicted background and foreground regions. Once the background and foreground layers have been identified and separated, the foreground layer can be composited on top of the image corresponding to the interactive map to produce a video stream of the participant with a modified background layer.

In some embodiments, an image corresponding to the interactive map can be a panoramic image that captures a wide-angle view of a scene (e.g., at least an X-degree image that is wider than the view of the camera of the local device of the participant) at the corresponding location on the map or a 360-degree image that captures a complete spherical view of the scene. In such instances, the image provided for background replacement can be a cropped selection of the panoramic or 360-degree image. In some embodiments, the cropped selection of the image can be dynamically (e.g., in real time) modified based on a change in orientation of the client device of the participant. For example, the system can track a rotational angle of the device to determine a degree of rotation between frames of the video stream. The cropped section of the image for background replacement can be modified to a degree proportional to the degree of rotation between the frames of the video stream. For instance, as the participant rotates the client device the image of the background replacement is correspondingly rotated (e.g., cropped) to give an appearance that the participant is rotating within the environment depicted by the background replacement image. In some embodiments, the system can track the rotation angle or orientation of the device and determine the degree of rotation based on an accelerometer or a sensor of the client device. In some embodiments, the system can track the rotation angle of the device and determine the degree of rotation by tracking marked elements within the background layer between frames and inferring a degree of device rotation based on movement of the marked elements between frames. This effect can further visually enhance the presentation and participants' perception that the participant with the replacement background is actually located in the location associated with the replaced background image.

Aspects of the present disclosure provide technical advantages over previous solutions. The advantages of the disclosed technique can provide integrated functionality of an interactive map with a virtual meeting platform that replaces a background layer of a participant's video stream based on a user indication of an image associated with a location on the map. Such features can provide an improved virtual meeting platform by providing additional functionality. Additionally, such features can provide an improved UI that simplifies the retrieval and selection of images associated with different locations and used for background replacement. The features can also result in more efficient use of computing resources, such as processing and storage resources utilized to facilitate background replacement by avoiding consumption of computing resources associated with the search, download, store, and upload of image files for background replacement.

Additionally, such integration of the virtual meeting platform with an interactive map significantly enhances the experience of participants of a virtual meeting that utilize background replacement by allowing seamless identification of images for background replacement with a lowered technical threshold for participants to find, store, and select images for background replacement. Moreover, in some instances, the interactive map can provide users with access to public photos of office addresses or indoor photos of offices. Such an implementation mitigates risk of users taking their own indoor photos, potentially leaking sensitive information displayed on whiteboards, computer displays, etc.

It can be noted that various aspects of the above referenced methods and systems are described in detail herein below by way of example, rather than by way of limitation. The embodiments and examples provided below can reference video streams for the purpose of simplicity and brevity only. However, embodiments and examples of the present disclosure can be applied to media items generally and can be applied to various types of content or media items, including for example images, videos, etc. Further, embodiments and examples provided below can describe a video stream that is provided in real time (e.g., live streaming). However, embodiment and examples of the present disclosure can be applied to videos that are provided on-demand (e.g., retrieved from a media item library, etc.).

FIG. 1 illustrates an example system architecture 100 capable of leveraging an interactive map for providing images for background replacement in a virtual meeting, in accordance with aspects and implementations of the present disclosure. The system architecture 100 (also referred to as "system" herein) includes client devices 102A-N, one or more client devices 104, a data store 110, a platform 120 (also referred to as "virtual meeting platform" herein), and models 160A-N, a server machine 130, a server machine 140, a server machine 150, and a server machine 170, each connected to a network 108.

In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video stream data, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments, data store 110 can be some other type of persistent storage such as an object-oriented database, a relational database, and so forth, that can be hosted by platform 120 or one or more different machines (e.g., the server machine 130) coupled to the platform 120 via network 108. In some implementations, the data store 110 can store portions of audio and video streams received from the client devices 102A-102N for the platform 120. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 102A-102N and/or concurrently editable by the users.

In some implementations, the data store 110 includes map data 112 and images 114. The map data 112 includes geospatial data that provides information about physical elements (e.g., roads, landmarks, rivers, stores, buildings, restaurants, parks, businesses, etc.) that can be used to generate a map for display at the client devices 102A-N or client devices 104. The map can display physical elements within a specific geographical area indicated (e.g., via an I/O device). The images 114 includes images of a variety of locations across the map generated using the map data. In some embodiments, the images 114 can include panoramic "street view" images (e.g., 360-degree panoramic images) of various location around the world. This can allow users to virtually explore streets, landmarks, and other locations of interest as if they were physically present at the location. The 360-degree panoramic images can be created by stitching together images in multiple directions. For example, the multiple images can be captured at regular intervals by a camera mounted on top of vehicle as the vehicle drives along streets and roads. In some embodiments, images 114 can include user-submitted photos associated with landmarks, businesses, parks, and other physical elements of the map. User-submitted photos can include a combination of static images and panoramic images.

In some embodiments, platform 120 can enable users of client devices 102A-102N and/or client device(s) 104 to connect with each other via a virtual meeting (e.g., a virtual meeting 121). A virtual meeting refers to a real-time communication session such as a virtual meeting call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Platform 120 can allow a user to join and participate in a virtual meeting call with other users of the platform. Embodiments of the present disclosure can be implemented with any number of participants connecting via the virtual meeting (e.g., five hundred or more).

The client devices 102A-102N can each include computing devices such as personal computers (PCs), laptops, mobile phones, smart phones, tablet computers, netbook computers, network-connected televisions, etc. In some implementations, client devices 102A-102N can also be referred to as "user devices 102A-102N." Each client device 102A-102N can include an audiovisual component that can generate audio and video data to be streamed to platform 120. In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-102N. In some implementations, the audiovisual component can also include an image capture device (e.g., a camera) to capture images and generate video data (e.g., a video stream) of the captured data of the captured images.

In some embodiments, platform 120 is coupled, via network 108, with one or more client devices 104 that are each associated with a physical conference or meeting room. Client device(s) 104 can include or be coupled to a media system 132 that can include one or more display devices 136, one or more speakers 142 and one or more cameras 144. Display device 136 can be, for example, a smart display or a non-smart display (e.g., a display that is not itself configured to connect to network 108). Users that are physically present in the room can use media system 132 rather than their own devices (e.g., client devices 102A-102N) to participate in a virtual meeting, which can include other remote users. For example, the users in the room that participate in the virtual meeting can control the display device 136 to show a slide presentation or watch slide presentations of other participants. Sound and/or camera control can similarly be performed. Similar to client devices 102A-102N, client device(s) 104 can generate audio and video data to be streamed to platform 120 (e.g., using one or more microphones, speakers 142 and cameras 144).

Each client device 102A-102N or client device(s) 104 can include a web browser and/or a client application (e.g., a mobile application, a desktop application, etc.). In some implementations, the web browser and/or the client application can present, on a display device 103A-103N of client device 102A-102N, a user interface (UI) (e.g., a UI of the UIs 124A-124N) for users to access platform 120. For example, a user of client device 102A can join and participate in a virtual meeting via a UI 124A presented on the display device 103A by the web browser or client application. A user can also present a document to participants of the virtual meeting via each of the UIs 124A-124N. Each of the UIs 124A-124N can include multiple regions to present video streams corresponding to video streams of the client devices 102A-102N provided to the server machine 130 for the virtual meeting.

In some implementations, the system 100 can include a virtual meeting manager (not illustrated). The virtual meeting manager can be included in at least one of the sever machine 130, serve machine 140, server machine 150, platform 120, or client devices 102A-N. The virtual meeting manager is configured to manage a virtual meeting between multiple users of platform 120. In some implementations, the virtual meeting manager can provide the UIs 124A-124N to each client device to enable users to watch and listen to each other during a virtual meeting. The virtual meeting manager can also collect and provide data associated with the virtual meeting to each participant of the virtual meeting. In some implementations, the virtual meeting manager can provide the UIs 124A-124N for presentation by a client application (e.g., a mobile application, a desktop application, etc.). For example, the UIs 124A-124N can be displayed on a display device 103A-103N by a native application executing on the operating system of the client device 120A-120N or the client device(s) 104. The native application can be separate from a web browser. In some embodiments, the virtual meeting manager can determine video streams for presentation in the UI 124A-124N during a virtual meeting. Such a video stream can depict, for example, a user of the respective client device while the user is participating in the virtual meeting (e.g., speaking, presenting, listening to other participants, watching other participants, etc., at particular moments during the virtual meeting), a physical conference or meeting room (e.g., with one or more participants present), a document or media content (e.g., video content, one or more images, etc.) being presented during the virtual meeting, and the like.

As described previously, an audiovisual component of each client device can capture images and generate video data (e.g., a video stream) of the captured data of the captured images. In some implementations, the client devices 102A-102N and/or client device(s) 104 can transmit the generated video stream to the virtual meeting manager. The audiovisual component of each client device can also capture an audio signal representing speech of a user and generate audio data (e.g., an audio file or audio stream) based on the captured audio signal. In some implementations, the client devices 102A-102N and/or client device(s) 104 can transmit the generated audio data to virtual meeting manager.

Training data generator 131 (e.g., residing at server machine 130) can generate training data to be used to train machine learning models 160A-N. Models 160A-N can include machine learning models used or otherwise accessible to video stream modifier 151. In some embodiments, training data generator 131 can generate the training data based on video frames of training videos and/or training images (e.g., stored at data store 110 or another data store connected to system 100 via network 108) and/or data associated with one or more client devices that accessed the training media items.

Server machine 140 can include a training engine 141. Training engine 141 can train machine learning models 160A-N using the training data from training data generator 131. In some embodiments, the machine learning models 160A-N can refer to model artifacts created by the training engine 141 using the training data that includes training inputs and corresponding target outputs (correct answers for respective training inputs). The training engine 141 can find patterns in the training data that map the training input to the target output (the answer to be predicted), and provide the machine learning models 160A-N that captures these patterns. The machine learning models 160A-N can be composed of, e.g., a single level of linear or non-linear operations (e.g., a Convolutional Neural Network (CNN) or other deep network, e.g., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning models 160A-N can refer to model artifacts that are created by training engine 141 using training data that includes training inputs. Training engine 141 can find patterns in the training data, identify clusters of data that correspond to the identified patterns, and provide the machine learning models 160A-N that captures these patterns. Machine learning models 160A-N can use one or more of clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some embodiments, machine learning models 160A-N can include a machine learning model 160A that is trained to predict, based on a given image or frame, such as a frame of a video stream 122, background and foreground regions for the given frame based on learned patterns and features. In some embodiments, the machine learning model 160A can be trained to predict segmentation masks. For example, the machine learning model 160A can be an image/frame segmentation model trained to predict segmentation masks that outline one or more regions corresponding to foreground objects in the image/frame. Segmentation masks indicate labels of pixels in an image/frame, the labels represent a region (e.g., a background region, a foreground region, etc.) to which the pixels correspond to. For example, the predicted segmentation mask can be represented as a two-dimensional data structure (e.g., an array) in which each element of the data structure corresponds to a pixel of a given frame. The value of each element of the data structure indicates class assigned to the respective pixel. For example, a value of 0 can indicate a background pixel and a value of 1 can indicate a foreground pixel.

Server machine 170 can include a map engine 171. Map engine 171 can facilitate integration of platform 120 with the functionality of an interactive map generated using map data 112 and for providing users of the platform 120 with access to images 114 associated with locations on the map. Map engine 171 can generate and provide the map for display within UI 124A-N of client devices 102A-N. The map engine 171 can receive indications of user input (e.g., via an input device such as a keyboard, a mouse, a touch screen, etc.) from the client devices 102A-N of a geographical area on the map to enable the user to navigate the map. The user input can cause the map engine 171 to update the map displayed within the UI 122A-N. For example, user can indicate a particular city, landmark, or other geographical area and cause the map to be updated to display the indicate geographical area. The user can further interact with specific location of the map and select an image associated with the specific location for background replacement. In response to the user indication to perform background replacement using the selected image, the map engine can query the data store 110 to obtain the indicated image from the images 114 and send the image to server machine 150 to perform the background replacement operation on the user's video stream 122.

Server machine 150 can include video stream modifier 151. Video stream modifier 151 can replace the background of the video stream 122 with the image indicated by the user and received from the map engine 171. In some embodiments, the video stream modifier can utilize a segmentation machine learning model to determine background and foreground layers of the video stream 122 in order to replace the background layer. For example, the video stream modifier can provide a frame of the video stream 122 as input to a segmentation machine learning model (e.g., machine learning model 160A) and obtain the background and foreground layers as output. The video stream modifier 151 can modify video stream 122 based on the outputs of the machine learning model to ensure the foreground layer is separated from the background layer and composited on top of the received image, thereby replacing the background layer of the video stream 122 with the image indicated by the user.

It can be noted that although FIG. 1 illustrates video stream modifier 151 and map engine 171 as part of platform 120. In additional or alternative embodiments, video stream modifier 151 and map engine 171 can reside on one or more server machines that are remote from platform 120 (e.g., server machines 130, 140, 150, 160, 170, etc.). It should be noted that in other implementations, the functions of server machines 130, 140, 150, 160, 170 and/or platform 120 can be provided by a fewer number of machines. For example, in some implementations, components and/or modules of any of server machines 130, 140, 150, 160, and 170 can be integrated into a single machine, while in other implementations components and/or modules of any of server machines 130, 140, 150, 160, and 170 can be integrated into multiple machines. In addition, in some implementations, components and/or modules of any of server machines 130, 140, 150, 160, and 170 can be integrated into platform 120. In general, functions described in implementations as being performed by platform 120 and/or any of server machines 130, 140, 150, 160, and 170, can also be performed on the client devices 102A-N in other implementations. For example, video stream modifier 151 can reside on server machines 130-170, client devices 102A-N, and/or client device 104. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of a virtual meeting platform 120 and users of a virtual meeting platform 120 participating in a virtual meeting, implementations can also be generally applied to any type of telephone call or conference call between users. Moreover, implementations of the disclosure are not limited to virtual meeting platforms that provide virtual meeting tools to users. For example, aspects and embodiments of the present disclosure can be applied to content sharing platforms that allow users to generate, share, view, and otherwise consumed media items such as video streams and other video items.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user can be provided with controls allowing the user to make an election as to both if and when systems, programs, or features described herein can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2A:
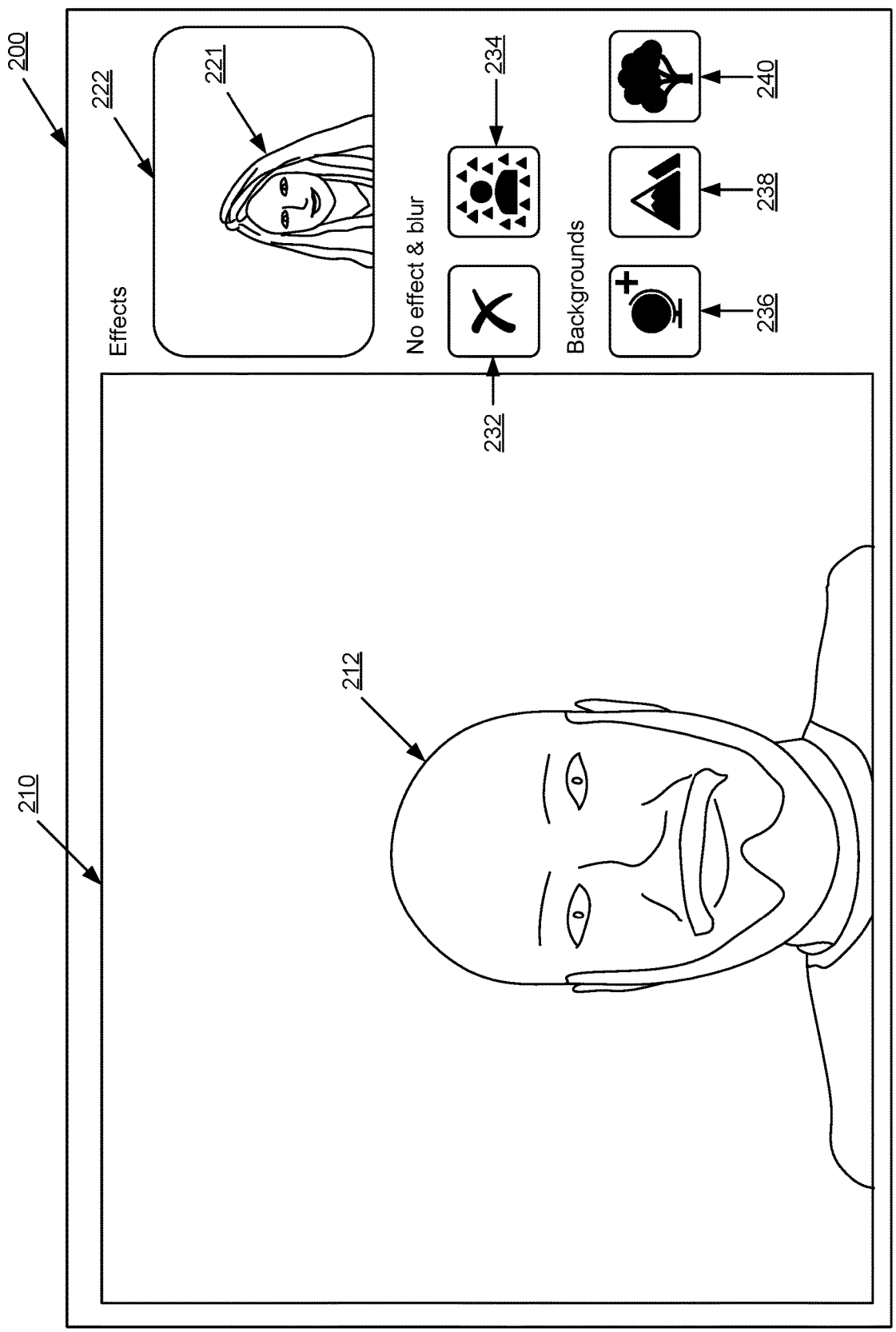
FIG. 2A illustrates an example user interface (UI) of a virtual meeting, in accordance with aspects and embodiments of the present disclosure.

FIG. 2A illustrates an example user interface (UI) 200 for a virtual meeting, in accordance with some embodiments of the present disclosure. The UI 200 can be generated by one or more processing devices of the one or more servers 130-170 of FIG. 1. In some embodiments, the UI 200 can be generated for presentation at a client device (e.g., client devices 102A-102N and/or 104). In some implementations, the virtual meeting between multiple participants can be managed by a virtual meeting platform, such as platform 120 of FIG. 1. The platform 120 can provide the UI 200 to enable participants to join and participate in the virtual meeting.

UI 200 can include a region 210 to display one or more video streams corresponding to video data captured and/or streamed by client devices, such as client devices 102A-102N of FIG. 1, associated with participants of the virtual meeting. In some embodiments, the region 210 can display a video stream of one participant of the virtual meeting. In an illustrative example, the region 210 can include a single region to display a video stream corresponding to the video data captured and/or stream by a client device associated with participant 212 of the virtual meeting. The illustrated single-region layout of the region 210 that focuses on the video stream of participant 212 while temporarily hiding video streams of other participants of the virtual meeting. The illustrated single-region layout of the region 210 is used by way of example, and not by way of limitation, noting that other layouts of UI 200 and region 210 are considered herein. For example, the region 210 can include multiple regions that each display a video stream corresponding to video data capture and/or streamed by client devices associated with multiple participants of the virtual meeting. The video streams of the multiple participants can be arranged in a grid pattern within the region 210 wherein each participant's video is displayed in a separate rectangular region. In another example, the video stream of a participant that is actively speaking can be displayed prominently within the region 210, while video streams of other participants' can be displayed within the UI 200 in smaller regions (e.g., "thumbnail" regions). In some embodiments, the platform can associate each region with a video stream received from a client device. In some embodiments, this can be done automatically without any user input specifying which video stream(s) are to be displayed at the region 210 within the UI 200.

In some embodiments, the user can interact with the UI 200 to cause a modification of a size or a position of video stream(s) displayed within the UI 200. For example, the user can use an input device (e.g., a keyboard, a touch screen etc.) or a cursor device (e.g., a mouse) associated with the client device to cause a modification of the size or the position of the video streams displayed within the UI 200. In some embodiments, the user can cause a modification of the position to a location outside of the UI 200. For example, in response to a user interaction (e.g., via a cursor, a touch screen etc.), the video stream of participant 212 can be detached from the UI 200 and moved to another display device. It is appreciated that the user can cause various modifications of video streams. For example, video streams can be resized, moved, zoomed in, cropped, transferred to another display device (e.g., another monitor), or otherwise adjusted to provide a preferred viewing environment. In another example, users can apply filters (e.g., sharpening filters, stylization filters, etc.), add contrast adjustments, or otherwise alter visual aesthetics of video streams according to a user's personal preference.

In some implementations, the UI 200 can also include an options region (not illustrated in FIG. 2A) for providing selectable options to adjust display settings (e.g., a size of each region, a number of regions, a selection of a video stream, etc.), invite additional users to participate, etc. In some implementations, the UI 200 can include a region 222 to display a self-view of the participant's 221 video stream alongside video streams of other participants of the virtual meeting. In some embodiments, the UI 200 can include an UI element (not illustrated) that corresponds to a self-view indicator, which can indicate to the participant 221 the participant's 221 video stream is displayed in a region in the UI.

The UI 200 can also include multiple UI elements (e.g., buttons) that, in response to a user interaction, apply an effect to the video stream. For example, the participant can interact with UI element 234 to cause blur effect to be applied to their video stream. In response to a user interaction with the UI element 234, a video stream modifier, such as video stream modifier 151 of FIG. 1, can identify the portion of the video stream corresponding to the rendering of the participant 221 (e.g., by using a segmentation machine learning model) and obscure details of the background while keeping the portion of the video stream corresponding to the rendering of the participant clear. The video stream modifier can continuously (e.g., for each frame of the video stream) render the video stream with the blur effect throughout the virtual meeting. The UI 200 can include a UI element 232 that the participant can interact with to cause video stream modifier to stop rendering their video stream with the applied blur effect.

In some embodiments, the platform can provide a set of pre-defined background images that participants of the platform can select for background replacement. For example, a participant can interact with the UI element 238 to cause the platform to replace the participant's background with a first background provided by the platform. The participant can interact with the UI element 240 to cause the platform to replace the participant's background with a second background provided by the platform. The UI 200 further includes a UI element 236. A user interaction with the UI element 236 can cause the platform is provide, for presentation within the UI, a map for selecting images for background replacement, as illustrated below with respect to FIG. 3A.

Figure 3A:
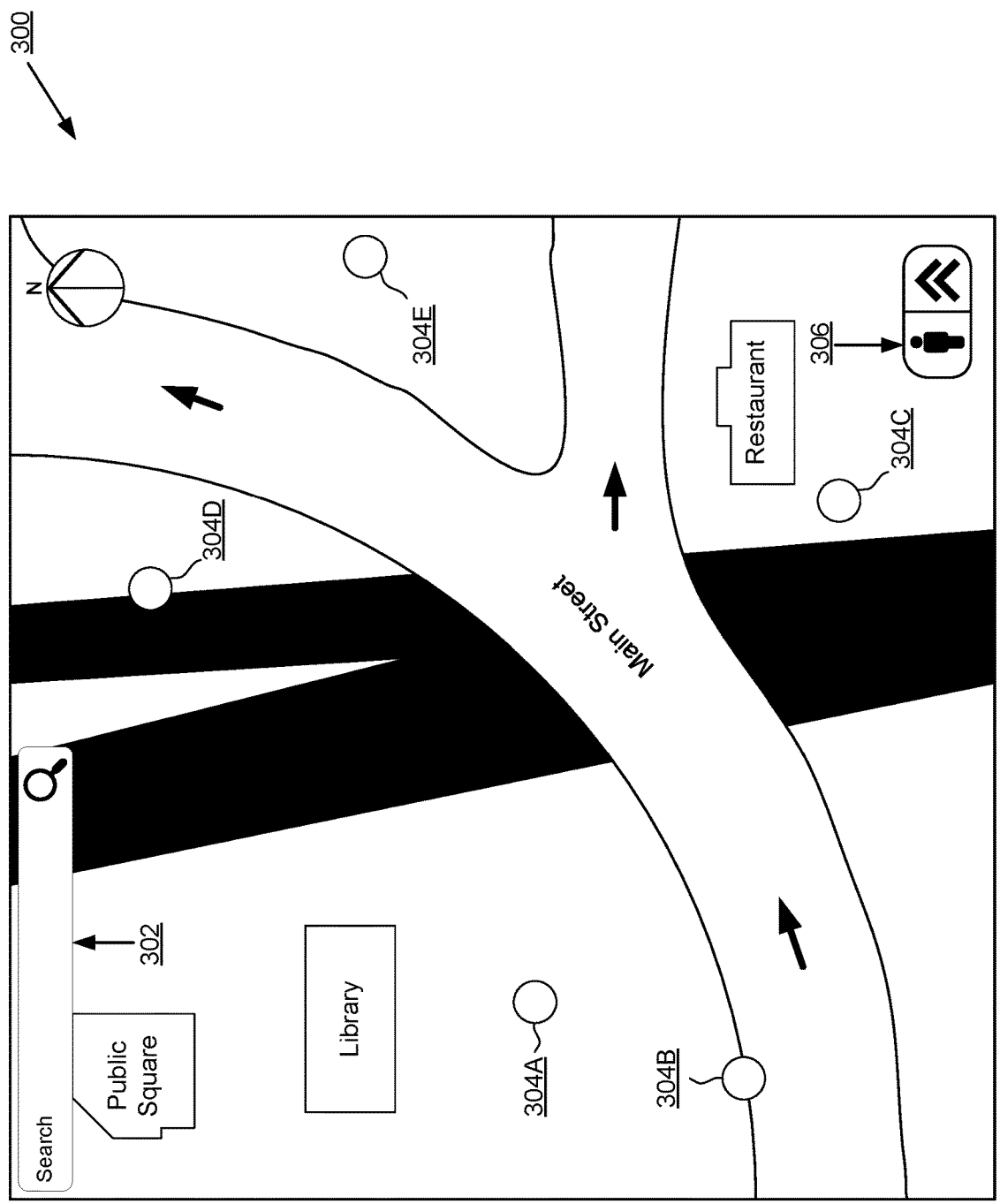
FIG. 3A illustrates an example UI for displaying a map for providing images for background replacement, in accordance with aspects and implementations of the present disclosure.

FIG. 3A illustrates an example UI 300 for displaying a map for providing images for background replacement, in accordance with aspects and implementations of the present disclosure. In some embodiments, the map can initially display a geographical area corresponding to the user's current location. In some embodiments, the map can display a predetermined geographical area. For example, a developer of the platform can determine an initial geographical area to be displayed by the map when the causes the map to be displayed within their UI. The map can include a two-dimensional (2D) overhead view of a geographical location displaying roads, highways, rivers, lakes, etc. As illustrated, the map displays a "main street" and a "central tunnel." The map can include various other points of interest such as restaurants, schools, businesses, parks, and the like. As illustrated, the map displays a public square, a library, and a restaurant. In some embodiments, the map can display a three-dimensional (3D) model of buildings, terrain, and other points of interest to provide an additional aspect of immersion and detail.

The UI 300 includes a search bar 302. The search bar 302 allows a user to locate and cause the UI 300 to display specific locations, addresses, and other points of interest. For example, a user can enter (e.g., via an input device such as a keyboard) a query into the search bar 302. The query can include a general term, an address, a name of a business, a category of a business, a specific restaurant, a category of a restaurant, and the like. According to the search query, can generate results, retrieve map data (e.g., map data 112) associated with the result, and display an updated map based on the retrieved map data.

The UI 300 includes interactive UI elements 304A-E. In some embodiments, each of the UI elements 304A-E can be associated with an image submitted by a user to the map platform. Each of the images is associated with the geographical location of the respective UI element 304A-E. In some embodiments, users can upload images to a map platform associated with the map. Users can access an application associated with the map using a client device to directly upload images to the map platform. For example, a user can upload an image of a tourist attraction visited while on a family vacation. To maintain quality and integrity of user-submitted content, the map platform can employ a content moderation process to ensure user-submitted images are appropriate and of a sufficient quality level (e.g., exceed a threshold quality level). Once user-submitted images are approved, users can access these photos when exploring the map. For example, a participant of a virtual meeting can interact with UI element 304C to cause a user-submitted photo associated with the UI element 304C to be retrieved (e.g., via an API call) from a map images database (e.g., images 114). The retrieved image can be displayed within the UI 300. In some embodiments, the participant can further cause, by interacting with the displayed image, a background of participant's video stream to be replaced with the image. Accordingly, by leveraging the map and user-submitted images associated with locations on the map, the virtual meeting platform can provide high-quality images to users for background replacement.

The UI 300 further includes an interactable UI element 306 to enable users to further interact with the map and obtain street view images associated with the map. The user can interact with (e.g., click) the UI element 306 (also referred to as "pegman 306" herein) and drag (e.g., using cursor device, a touch screen, etc.) the pegman 306 to a position on the map to view image data associated with that location, as illustrated below with respect to FIG. 3B.

Figure 3B:
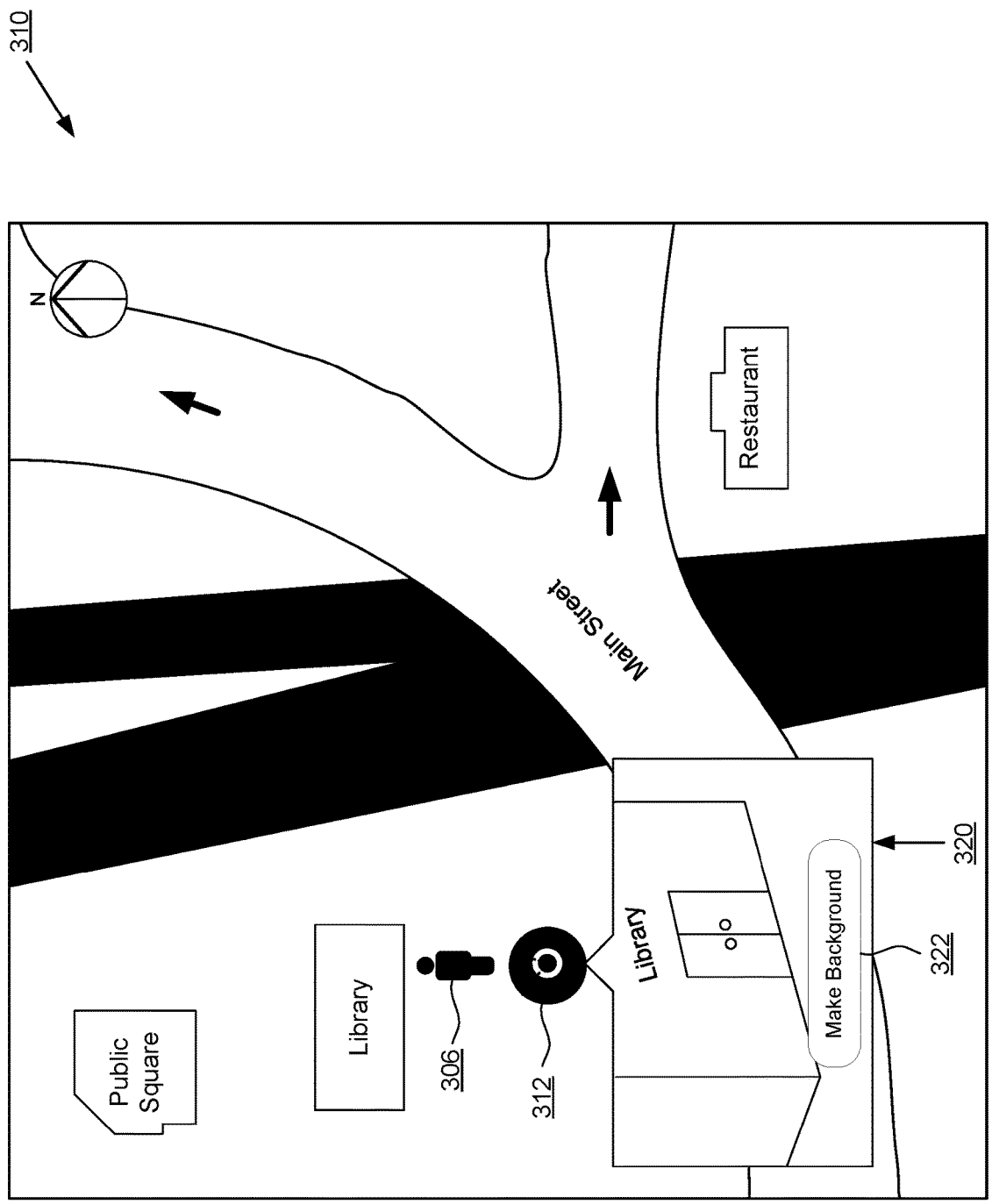
FIG. 3B illustrates another example UI for displaying a map for providing images for background replacement, in accordance with aspects and implementations of the present disclosure.

FIG. 3B illustrates another example UI 310 for displaying a map for providing images for background replacement, in accordance with aspects and implementations of the present disclosure. Specifically, FIG. 3B illustrates how a participant can select an image for background replacement by adjusting a position of a UI element on a map. The UI 310 is similar to the UI 300 of FIG. 3A, but now shows a position of a pegman 306 and an indicator 312 of the location and an orientation of the pegman 306. The orientation of the pegman 306 is indicated by a direction of the cone extending from the indicator 312. For example, the pegman 306 is illustrated to be placed south of the library in north-west orientation, looking towards the library.

The UI 310 can include a region 320 to display a street view image associated with the location and orientation of the pegman 306. A street view image is an image captured at approximately ground level to visualize a point of view around street level. In some embodiments, street view images are generated by from many images taken throughout the world. The street view image can be a 360-degree panoramic image composed of multiple image of a location taken from multiple angles and stitched together. The region 320 can display a cropped version of the 360-degree panoramic street view image based on the indicated orientation of the pegman 306. For example, indicator 312 includes a cone that indicates a north-west direction towards the library. Accordingly, the region 320 can display a cropped selection of a panoramic street view image at the location of the pegman 306 showing a view of the library. The user can further interact with the pegman 306 to update an orientation the pegman and a view a different cropped selection of the panoramic street view image. The user can also update a location of the pegman to view another street view image associated with a different location. For example, the user can drag the pegman 306 to a location just south of the restaurant and orient the pegman 306 towards the restaurant to cause the region 320 to be updated to present a cropped selection of a new street view image displaying the restaurant from a perspective just south of the restaurant.

The region 320 includes a UI element 322 (e.g., a button) within the region 320. In response to a user interaction with the UI element 322, a participant can cause their background to be replaced with image currently presented within the region 320, as illustrated below with respect to FIG. 2B. Accordingly, the map can provide participants of a video conference with access to street view images associated with locations on the map for background replacement in a virtual meeting.

Figure 2B:
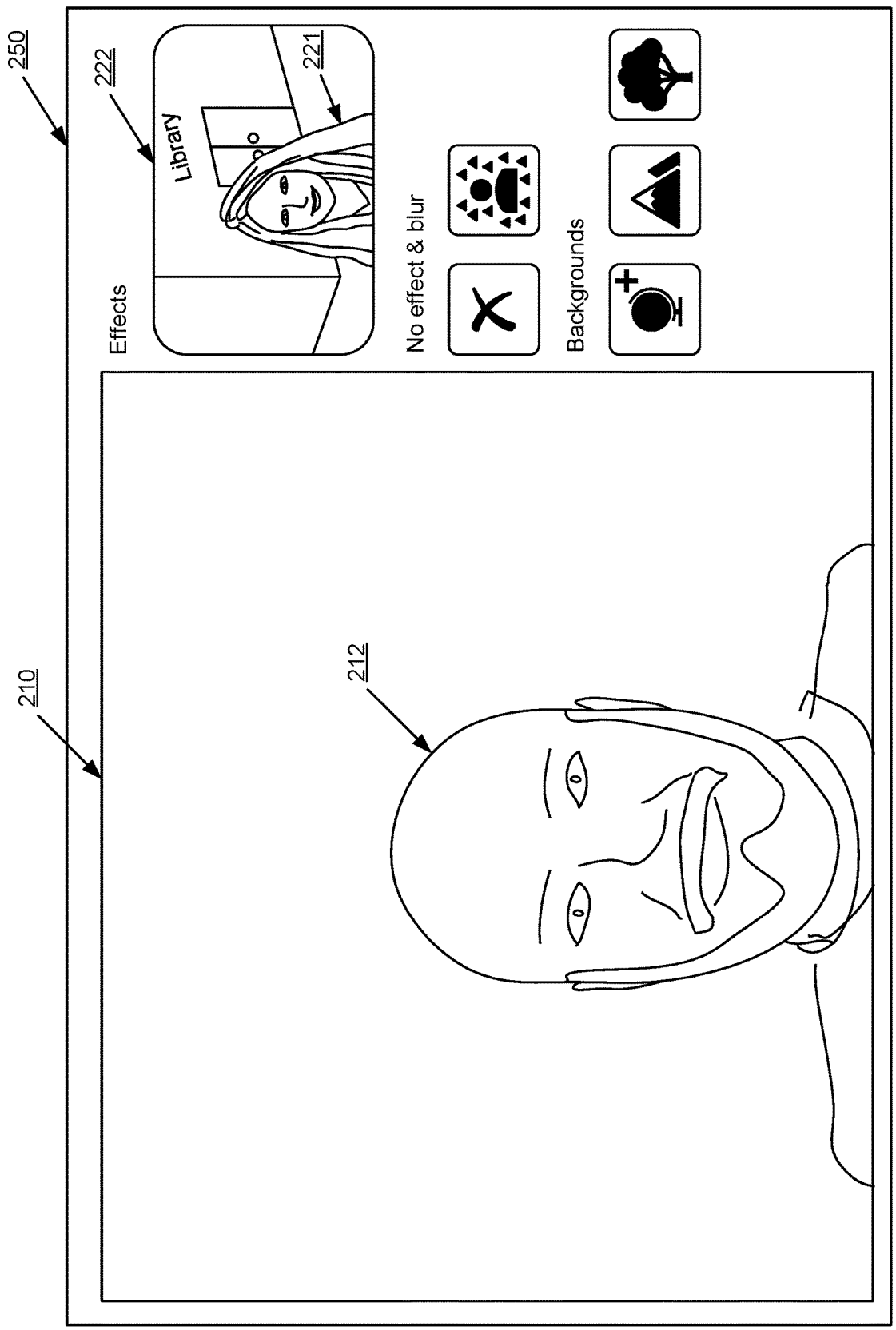
FIG. 2B illustrates another example UI of a virtual meeting, in accordance with aspects and embodiments of the present disclosure.

FIG. 2B illustrates another example UI 250 of a virtual meeting, in accordance with aspects and embodiments of the present disclosure. Specifically, FIG. 2B illustrates replacement of a participant's background based on an image selected from and associated with a location on a map, such as the map displayed within the UI 310 of FIG. 3B. The UI 250 is similar to the UI 200 of FIG. 2A, but now shows a region 222 displaying a participant's video stream with the background replaced. As illustrated, the region 222 now displays a self-view the participant's video stream with a background corresponding to the image of the library displayed within the region 320 of FIG. 3B.

In some embodiments, to perform the background replacement operation, frames of the video stream displayed within the region 222 can first be separated into a background and foreground layer. In some embodiments, a video stream modifier, such as video stream modifier 151, can cause the frames video stream to be separated into a background and foreground layers. The foreground layer can include a rendering of the participant 221. The background layer can include visual surroundings or scenery behind the participant 221, such as visual objects within a room.

In some embodiments, to separate the background and foreground layers, the video stream modifier can segment the video stream using various computer vision techniques. Segmentation refers to the process of dividing an image into multiple regions or segments. For example, the video stream can be segmented into multiple background regions that, when combined, form the background layer; and into multiple foreground regions that, when combined, form the foreground layer. In some embodiments, frames of the video stream can be segmented using a segmentation machine learning model that is trained to predict, based on a given image or frame, such as a frame of the video stream, background regions and foreground regions based on learned patterns and features. The segmentation machine learning model can be trained on historical data such as frames/images and labeled data indicating which regions (e.g., pixels) are background regions and which regions are foreground region. Training data (historical data) can be labeled using ground truth data indicating which regions are part of the foreground and which regions are part of the background. The ground truth data can be established by human observers or through an automated tool.

After training and deployment, the segmentation machine learning model can process frames of the video stream and predict background and/or foreground regions of the video stream based on learned patterns from the training data. The segmentation model can provide one or more foreground and background regions as output to the video stream modifier. In some embodiments, the video stream modifier can combine the predict foreground regions obtain as output from the segmentation model to obtain the foreground layer and combine the predict background regions obtained as output form the segmentation model to obtain the background layer. The video stream modifier can replace the obtain background layer with the selected image. In some embodiments, the background layer can be replaced by compositing the foreground layer on top of the selected image. For example, as shown in the region 222 displaying a self-view of the participant 221, the rendering of participant 211 is now composited on top of the selected background image. The video stream with the replaced background can also be provided for display on other client devices associated with other participants of the virtual meeting. For example, the video stream with the replaced background can be provided for display on a client device associated with the participant 212 of the virtual meeting.

As mentioned above, the image used for background replacement can be a cropped selection of a 360-degree panoramic image. A cropped selection of a 360-degree panoramic image can refer to a portion of the panoramic image that have been isolated and extracted from the panoramic image. For example, the cropped selection can be a portion of a street view image, as described above with respect to FIG. 3B. In some embodiments, the cropped selection of the panoramic image can be dynamically (e.g., in real time) modified based a degree of rotation of the client device capturing the associated video stream. Accordingly, rather than the replaced background being a static background, the background can be continually (e.g., for each frame of the video stream) updated based on device orientation data to simulate that the participant is actually present in the location depicted by the virtual background. Device orientation data can refer to a position and orientation of the device in a physical space. For example, if the participant rotates their device 30 degrees to the right, video stream modifier can modify a cropped selection of the 360-degree panoramic images 30 degrees in the same direction. The replaced background thereby rotates to match the change in the device orientation data.

In some embodiments, device orientation data can be detected or determined by device sensors, gyroscope, accelerometers, or other tracking systems built into the client device (e.g., mobile devices). Some client devices (e.g., web cameras, laptops, etc.) lack motion tracking sensors. Accordingly, in some embodiments, device orientation or rotation can be deduced by analyzing the captured video stream. For example, a machine learning model can be trained to detect and track distinctive features in visual environment of the video stream, such as corners, edges, facial features, and distinct objects in the visual environment to serve as reference markers. The model can track match these reference markers between consecutive frames of the video stream. Based on the positional changes of the reference markers between frames, the model can determine motion vectors that indicate a degree and direction of the positional changes of the reference markers. According to the motion vectors, the model can predict the client device's movement along an axes (e.g., X, Y, and Z axes) and device orientation/rotation (e.g., pitch, yaw, roll). For example, the model can predict a 30 degree rotation of the client device between a first frame a second frame. The video stream modifier can receive the prediction as output from the model and modify the cropped selection of the 360-degree panoramic image 30 degrees in the same direction.

In some instances, the cropped selection of the panoramic image can include a measure of perspective distortion. Perspective distortion is a typical consequence of cropping a selection of a panoramic image because a panoramic image covers a wide field of view that results in a perspective in which objects closer to the camera appear larger, and objects farther away appear smaller. For example, when a center portion of a panoramic image is cropped, objects in the cropped selection can appear compressed. When outer edges of the panoramic image are cropped, objected in the cropped selection can appear stretched. The video stream modifier can correct perspective distortion of the cropped selection of the panoramic image using commonly known software and/or hardware techniques.

Figure 4:
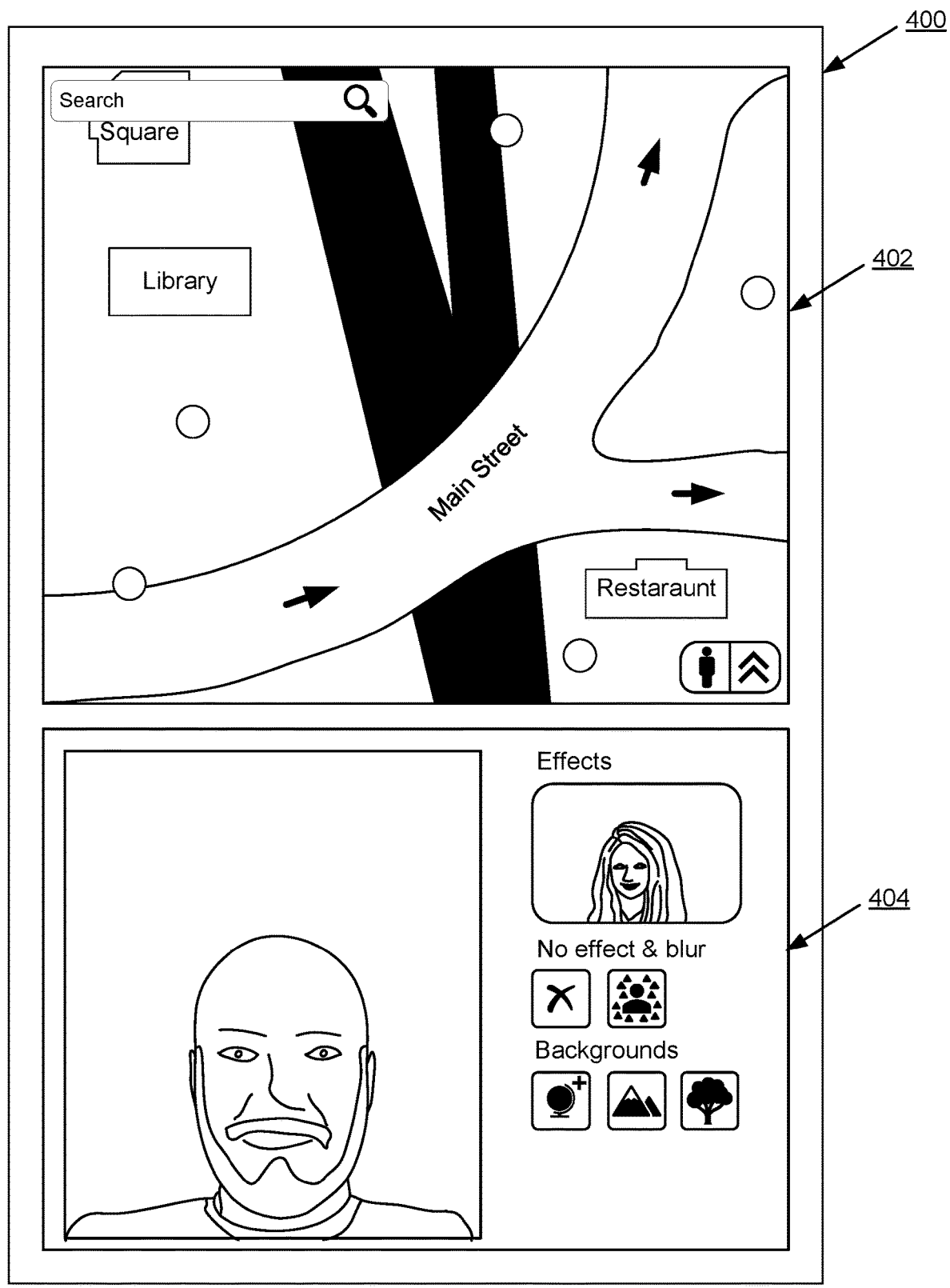
FIG. 4 illustrates an example UI for integrating a map with a virtual meeting, in accordance with aspects and implementations of the present disclosure.

FIG. 4 illustrates an example UI 400 for integrating a map with a virtual meeting, in accordance with aspects and implementations of the present disclosure. The UI 400 includes a map region 402 to display a map and a virtual meeting region 404 to display a UI of a virtual meeting. In some embodiments, the map region 402 can display the map described above with respect to FIG. 3A. In some embodiments, the virtual meeting region 404 can display the UI 200 of FIG. 2A. As illustrated, the map region 402 and the virtual meeting region 404 are displayed simultaneously in a vertical orientation within the UI 400. In some embodiments, the map region 402 and the virtual meeting region 404 can be arranged differently. For example, virtual meeting region can be displayed as a smaller region overlayed at a corner of a larger map region 402 that encompasses the entire UI 400. Generally, a size of the map region 402 and the virtual meeting region 404 can be increased or decreased, and a shape of the two regions can be different. In some embodiments, users can toggle between different presentation modes of the UI 400.

Figure 5:
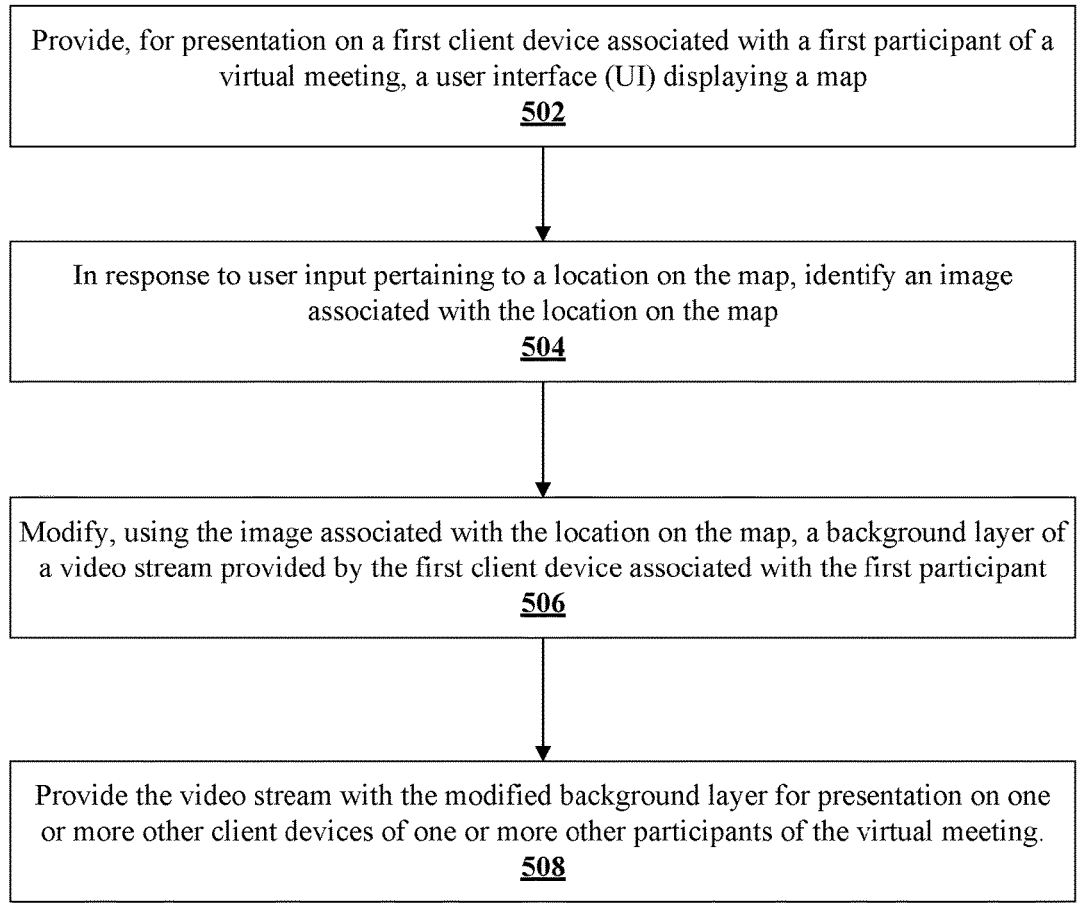
FIG. 5 depicts a flow diagram of a method for leveraging an interactive map for providing images for background replacement in a virtual meeting, in accordance with aspects and implementations of the present disclosure.

FIG. 5 depicts a flow diagram of a method 500 for leveraging an interactive map for providing images for background replacement in a virtual meeting, in accordance with aspects and implementations of the present disclosure. Method 500 can be performed by processing logic that can include hardware (circuitry, dedicated logic, etc.), software (e.g., instructions run on a processing device), firmware, and/or a combination thereof. In one implementation, some or all the operations of method 500 can be performed by one or more components of system 100 of FIG. 1 (e.g., platform 120, server machine 130-170, video stream modifier 151, and/or map engine 171).

For simplicity of explanation, the method 500 of this disclosure is depicted and described as a series of acts. However, acts in accordance with this disclosure can occur in various orders and/or concurrently, and with other acts not presented and described herein. Furthermore, not all illustrated acts can be required to implement the method 500 in accordance with the disclosed subject matter. In addition, those skilled in the art will understand and appreciate that the method 500 could alternatively be represented as a series of interrelated states via a state diagram or events. Additionally, it should be appreciated that the method 500 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operation 502, processing logic can provide, for presentation on a first client device associated with a first participant of a virtual meeting, a user interface (UI) displaying a map.

At operation 504, in response to user input pertaining to a location of the map, the processing logic can identify an image associated with the location on the map.

At operation 506, the processing logic can modify, using the image associated with the location on the map, a background layer of a video stream provided by the first client device associated with the first participant. In some embodiments, to modify the background layer of the video stream, the processing logic can identify the background layer and a foreground layer in the video stream. The background layer is associated with images of surroundings of the first participant as captured by a camera of the first client device. The foreground layer is associated with images of the first participant as captured by the camera of the first client device. The processing logic can composite the foreground layer on top of the image associated with the location on the map.

In some embodiments, to identify the background layer and the foreground layer in the video stream, the processing logic can provide a frame of the video stream as input to a machine learning model. The machine learning model is trained to predict, based on a given frame, segmentation labels for the given frame that represent foreground and background regions of the given frame. The processing logic can obtain outputs from the machine learning model. The outputs include one or more foreground regions and one or more background regions. The processing logic can combine the one or more foreground regions to obtain the foreground layer and combine the one or more background regions to obtain the background layer.

In some embodiments, the processing logic is further to dynamically modify the cropped selection of the panoramic image based on a change of position of the first client device capturing the video stream. To dynamically modify the cropped selection of the panoramic image based on a change of position of the first client device capturing the video stream, the processing logic is to determine a degree of rotation of the first client device between a first frame of the video stream and a second frame of the video stream. The processing logic can modify the cropped selection of the panoramic image proportional to the degree of rotation of the first client device. In some embodiments, to determine the degree of rotation of the first client device, the processing logic can measure the degree of rotation using a sensor of the first client device. In some embodiments, to determine the degree of rotation of the first client device, the processing logic can identify one or more markers within the first frame of the video stream. The processing logic can further identify the one or more markers within the second frame of the video stream and determine the degree of rotation based on a positional difference of the one or more markers between the first frame and the second frame of the video stream.

At operation 508, the processing logic can provide the video stream with the modified background layer for presentation on one or more other client devices of one or more other participants of the virtual meeting.

Figure 6:
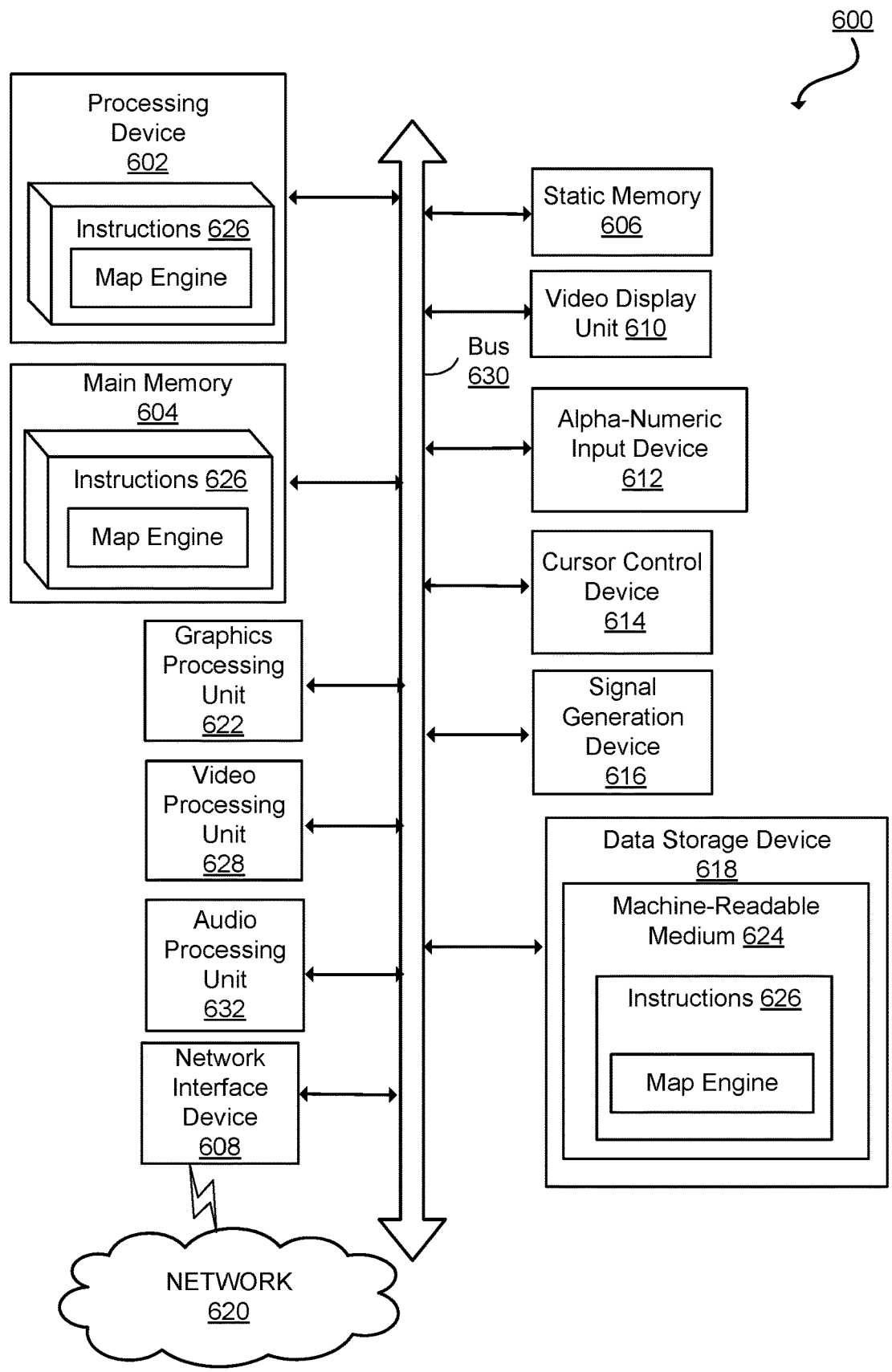
FIG. 6 illustrates an example machine of a computer system within which a set of instructions, for causing the machine to perform any one or more of the methodologies discussed herein, can be executed, in accordance with aspects and implementations of the present disclosure.

FIG. 6 illustrates an example machine of a computer system 600 within which a set of instructions, for causing the machine to perform any one or more of the methodologies discussed herein, can be executed, in accordance with aspects and implementations of the present disclosure. The computer system 600 can be server machines 130-170 or client devices 102A-N of FIG. 1. In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM), a static memory 606 (e.g., flash memory, static random-access memory (SRAM), etc.), and a data storage device 618, which communicate with each other via a bus 630.

Processing device 602 represents one or more processors such as a microprocessor, a central processing unit, or the like. More particularly, the processing device can be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps described herein.

The computer system 600 can further include a network interface device 608 to communicate over the network 620. The computer system 600 also can include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 can include a machine-readable storage medium 624 (also known as a non-transitory computer-readable storage medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm can be a sequence of operations leading to a desired result. The operations are those requiring physical manipulations of physical quantities. Such quantities can take the form of electrical or magnetic signals capable of being stored, combined, compared, and otherwise manipulated. Such signals can be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems can be used with programs in accordance with the teachings herein, or it can prove convenient to construct a more specialized apparatus to perform a similar sequence of procedures. In addition, the present disclosure is not described with reference to any particular programming language and any one in use in such computer systems can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications can be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, engines, modules, and so on have been described with respect to interact between several components and/or blocks. It can be appreciated that such systems, engines, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

The methods and illustrative examples described herein are not inherently related to any particular computer or other apparatus. Various general purpose systems can be used in accordance with the teachings described herein, or it can prove convenient to construct more specialized apparatus to perform method 500 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
providing, for presentation on a first client device associated with a first participant of a virtual meeting, a user interface (UI) displaying a map;
receiving user input pertaining to a location on the map and indicating a request to use an image associated with the location on the map as a background for a video stream provided by the first client device during the virtual meeting;
in response to the received user input, identifying the image associated with the location on the map;
modifying, using the image associated with the location on the map, a background layer of the video stream provided by the first client device associated with the first participant; and
providing the video stream with the modified background layer for presentation on one or more other client devices of one or more other participants of the virtual meeting.

2. The method of claim 1, wherein modifying, using the image associated with the location on the map, the background layer of the video stream provided by the first client device associated with the first participant comprises:
identifying the background layer and a foreground layer in the video stream, wherein the background layer is associated with images of surroundings of the first participant as captured by a camera of the first client device, and the foreground layer is associated with images of the first participant as captured by the camera of the first client device; and
compositing the foreground layer on top of the image associated with the location on the map.

3. The method of claim 2, wherein identifying the background layer and the foreground layer in the video stream comprises:
providing a frame of the video stream as input to a machine learning model, wherein the machine learning model is trained to predict, based on a given frame, segmentation labels for the given frame that represent foreground and background regions of the given frame;
obtaining a plurality of outputs from the machine learning model, wherein the plurality of outputs comprises one or more foreground regions and one or more background regions;

combining the one or more foreground regions to obtain the foreground layer; and
combining the one or more background regions to obtain the background layer.

4. The method of claim 1, wherein the image associated with the location on the map is a cropped selection of a panoramic image.

5. The method of claim 4, further comprising dynamically modifying the cropped selection of the panoramic image based on a change of position of the first client device capturing the video stream.

6. The method of claim 5, wherein dynamically modifying the cropped selection of the panoramic image based on a change of position of the first client device capturing the video stream comprises:
determining a degree of rotation of the first client device between a first frame of the video stream and a second frame of the video stream; and
modifying the cropped selection of the panoramic image proportional to the degree of rotation of the first client device.

7. The method of claim 6, wherein determining the degree of rotation of the first client device comprises measuring the degree of rotation using a sensor of the first client device.

8. The method of claim 6, wherein determining the degree of rotation of the first client device comprises:
identifying one or more markers within the first frame of the video stream;
identifying the one or more markers within the second frame of the video stream; and
determining the degree of rotation based on a positional difference of the one or more markers between the first frame and the second frame of the video stream.

9. A system comprising:
a memory device; and
a processing device coupled to the memory device, the processing device to perform operations comprising:
providing, for presentation on a first client device associated with a first participant of a virtual meeting, a user interface (UI) displaying a map;
receiving user input pertaining to a location on the map and indicating a request to use an image associated with the location on the map as a background for a video stream provided by the first client device during the virtual meeting;
in response to the received user input, identifying the image associated with the location on the map;
modifying, using the image associated with the location on the map, a background layer of the video stream provided by the first client device associated with the first participant; and
providing the video stream with the modified background layer for presentation on one or more other client devices of one or more other participants of the virtual meeting.

10. The system of claim 9, wherein modifying, using the image associated with the location on the map, the background layer of the video stream provided by the first client device associated with the first participant comprises:
identifying the background layer and a foreground layer in the video stream, wherein the background layer is associated with images of surroundings of the first participant as captured by a camera of the first client device, and the foreground layer is associated with images of the first participant as captured by the camera of the first client device; and
compositing the foreground layer on top of the image associated with the location on the map.

11. The system of claim 10, wherein identifying the background layer and the foreground layer in the video stream comprises:
providing a frame of the video stream as input to a machine learning model, wherein the machine learning model is trained to predict, based on a given frame, segmentation labels for the given frame that represent foreground and background regions of the given frame;
obtaining a plurality of outputs from the machine learning model, wherein the plurality of outputs comprises one or more foreground regions and one or more background regions;
combining the one or more foreground regions to obtain the foreground layer; and
combining the one or more background regions to obtain the background layer.

12. The system of claim 9, wherein the image associated with the location on the map is a cropped selection of a panoramic image.

13. The system of claim 12, further comprising dynamically modifying the cropped selection of the panoramic image based on a change of position of the first client device capturing the video stream.

14. The system of claim 13, wherein dynamically modifying the cropped selection of the panoramic image based on a change of position of the first client device capturing the video stream comprises:
determining a degree of rotation of the first client device between a first frame of the video stream and a second frame of the video stream; and
modifying the cropped selection of the panoramic image proportional to the degree of rotation of the first client device.

15. The system of claim 14, wherein determining the degree of rotation of the first client device comprises measuring the degree of rotation using a sensor of the first client device.

16. The system of claim 14, wherein determining the degree of rotation of the first client device comprises:
identifying one or more markers within the first frame of the video stream;
identifying the one or more markers within the second frame of the video stream; and
determining the degree of rotation based on a positional difference of the one or more markers between the first frame and the second frame of the video stream.

17. A non-transitory computer-readable storage medium comprising instructions for a server that, when executed by a processing device, cause the processing device to perform operations comprising:
providing, for presentation on a first client device associated with a first participant of a virtual meeting, a user interface (UI) displaying a map;
receiving user input and indicating a request to use an image associated with the location on the map as a background for a video stream provided by the first client device during the virtual meeting;
in response to the received user input, identifying the image associated with the location on the map;
modifying, using the image associated with the location on the map, a background layer of the video stream provided by the first client device associated with the first participant; and providing the video stream with the modified background layer for presentation on one or more other client devices of one or more other participants of the virtual meeting.

18. The non-transitory computer-readable storage medium of claim 17, wherein modifying, using the image associated with the location on the map, the background layer of the video stream provided by the first client device associated with the first participant comprises:
- identifying the background layer and a foreground layer in the video stream, wherein the background layer is associated with images of surroundings of the first participant as captured by a camera of the first client device, and the foreground layer is associated with images of the first participant as captured by the camera of the first client device; and
- compositing the foreground layer on top of the image associated with the location on the map.

19. The non-transitory computer-readable storage medium of claim 18, wherein identifying the background layer and the foreground layer in the video stream comprises:
- providing a frame of the video stream as input to a machine learning model, wherein the machine learning model is trained to predict, based on a given frame, segmentation labels for the given frame that represent foreground and background regions of the given frame;
- obtaining a plurality of outputs from the machine learning model, wherein the plurality of outputs comprises one or more foreground regions and one or more background regions;
- combining the one or more foreground regions to obtain the foreground layer; and
- combining the one or more background regions to obtain the background layer.

20. The non-transitory computer-readable storage medium of claim 17, wherein the image associated with the map is a cropped selection of a panoramic image.

* * * * *